TUNER STRUCTURE WITH PRINTED CIRCUIT CARDS, ACTUATING MEANS AND CANTILEVER SPRING CONTACT

Filed Sept. 30, 1965

2 Sheets-Sheet 1

INVENTORS.
DONALD F. WILLMANN
WILLIAM T. WOOD
BY Alden D. Redfield
Charles M. Hogan
ATTORNEYS.

INVENTORS.
DONALD F. WILLMANN
BY WILLIAM T. WOOD
Alden D. Redfield
Charles M. Hogan
ATTORNEYS.

United States Patent Office 3,327,072
Patented June 20, 1967

3,327,072
TUNER STRUCTURE WITH PRINTED CIRCUIT CARDS, ACTUATING MEANS AND CANTILEVER SPRING CONTACT

Donald F. Willmann and William T. Wood, Cincinnati, Ohio, assignors to Avco Corporation, Cincinnati, Ohio, a corporation of Delaware
Filed Sept. 30, 1965, Ser. No. 491,735
9 Claims. (Cl. 200—14)

ABSTRACT OF THE DISCLOSURE

In this tuner a rectangular metallic housing is formed with partitions. Its base is a horizontal circuit board with direct current connector elements. Removable switch cards are individually inserted into the compartments formed by the partitions and are engaged in slots formed in the housing. Each switch card comprises a rotor and a stator. The stator carries horizontally extending radio frequency connector elements and a vertically extending direct current connector element. As each card is placed in its compartment the direct current connector element on the stator mates with its complement on the circuit board and each radio frequency connector element on each stator mates with a complement on the adjoining stator. The rotors are formed with gear teeth and are driven in unison by a gearing system including bushings which the stators are slotted to engage.

The present invention relates to tuners for electronic communication systems. The objects of the invention are to provide a tuner having the following desirable characteristics:

(1) Pronounced compactness;

(2) Ruggedness, durability and continuity of operation under rigorous environmental conditions;

(3) Flexibility of design, there being no inherent system limitation on the number of plug-in card inserts incorporated in the tuner;

(4) Firm guidance and indexing of the plug-in cards;

(5) Quick make and break of both direct current connections and radio frequency connections for the plug-in cards;

(6) Effective shielding;

(7) Utilization of the tuning shaft structure to aid in positioning the plug-in cards;

(8) Extremely low contact resistance at the various contact points, particularly those involving removable elements.

Another primary object of the invention is to provide an improved tuner comprising, in combination, a metallic housing formed to receive, guide and position removable switch cards of the plug-in type, together with novel and improved means for establishing the required contacts, shielding and providing for manual adjustment.

For a better understanding of the invention, together with other and further objects, advantages and capabilities thereof, reference is made to the following description of the accompanying drawings, in which.

Figure 3:
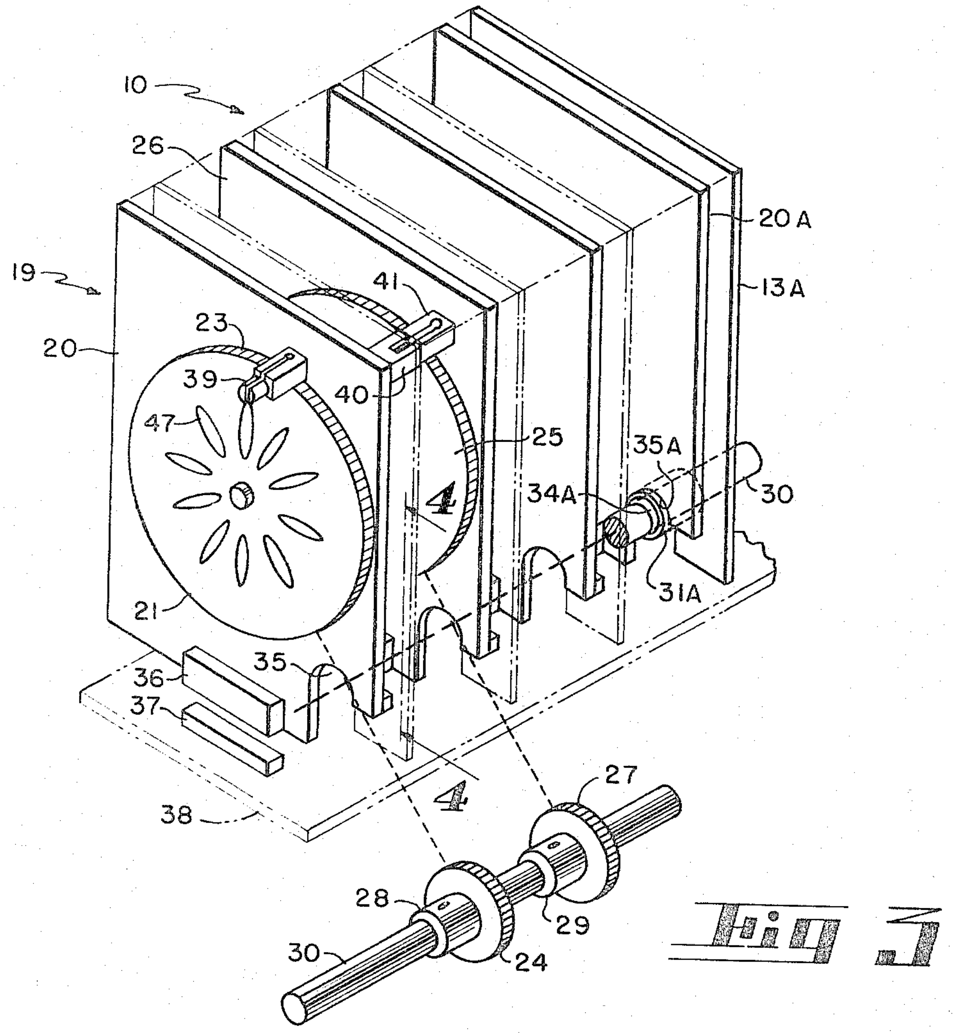
Figure 4:
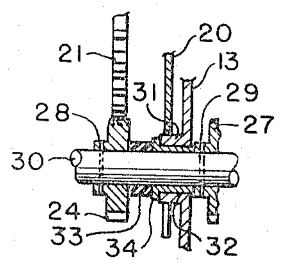

FIG. 3 is an exploded and fragmentary perspective view showing the positional relationships among the plug-in switch cards, the shielding partitions, the platform circuit board, and the manually operative adjusting elements included in said tuner, and FIG. 4 is a fragmentary sectional view as taken along section line 4—4 of FIG. 3, and assuming all of the manually operative adjusting elements to be in place, this figure showing details of the adjusting shaft and the manner in which associated elements are related to the shielding partitions and the plug-in switch cards.

At ths point it should be mentioned that each plug-in switch card carries on the front of its rotor portion a number of tank or frequency determining circuits, each comprising inductance and capacitance and each being appropriate to tune a circuit to a selected band. These circuit elements are not here shown in detail in that those of ordinary skill in this art are thoroughly familiar with inductance-capacitance combinations and the fact that the tuning of a circuit involves the selection of a particular combination. Accordingly the rotor elements such as that numbered 21 in FIG. 3 are here shown without their various tank circuit elements in place.

Figure 1:
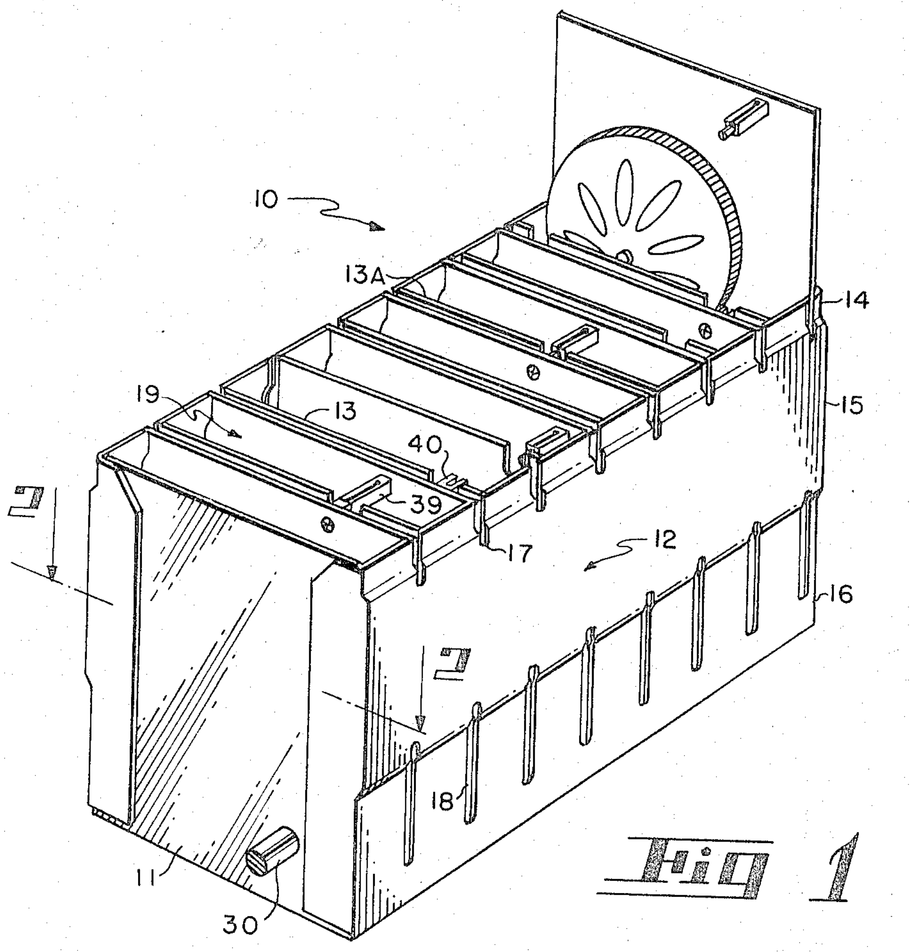
FIG. 1 is a perspective view of an improved tuner in accordance with the invention.

Referring now specifically to FIG. 1, there is shown a metallic housing generally indicated by the reference numeral 10. It is box-like in configuration and has a metallic front 11, left side, right side 12, a rear, and an open top. Integrated with the housing, as by welding, secured therein and extending transversely thereto, are a plurality of metallic radio frequency shields, of which a representative one is shown at 13. Since there are eight plug-in card inserts in the embodiment herein shown, seven partitions such as 13 are provided, it being understood that the front and the rear of the housing also perform shielding functions.

Each side of the housing is formed with an upper marginal portion 14, an outwardly bulging portion 15, and a lower portion 16. The upper and lower portions of side 12 are formed with eight vertically extending and aligned groups of upper and lower slot formations such as those numbered 17 and 18 in FIG. 1. It will be understood that on the left side of housing 10 there are like formations, of which a representative group is registered with the formations 17–18 in such a manner as to position switch card 19, for example, in parallelism with the remaining switch cards and with the front and back of the housing. The bulging central portions of the side surfaces prevent the plug-in cards from moving laterally outwardly. Each card is guided during insertion and then secured and positioned each by four formations (for example, 17–18 and the corresponding slots on the left side of the housing).

In accordance with the invention plug-in type removable switch cards are inserted into the housing 10 and firmly positioned and spaced from each other by these slot formations. Due to this construction, the cards may be inserted or replaced as desired, whether for purposes of repair or replacement or modified electronic requirements. A representative card numbered 19 is selected for further detailed discussion herein. This card (FIG. 3) comprises a stator member or card proper 20 and a rotor 21.

Figure 2:
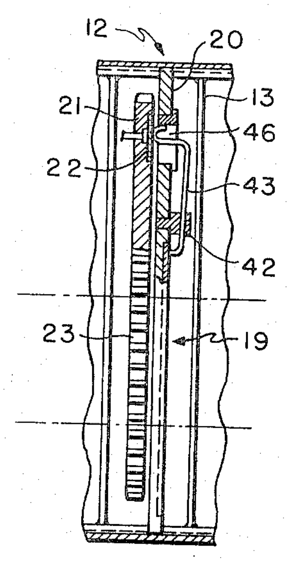
FIG. 2 is a fragmentary and partially sectional view as taken along section line 2—2 of FIG. 1, looking in the direction of the arrows, and showing a typical switch contact as included in one of the plug-in switch cards.

Each rotor carries, on its rear surface, a plurality of angularly spaced imbedded metallic contacts such as 22 (FIG. 2). In practice the rotor generally carries sets of angularly displaced contacts, each set being at a different radial distance from the axis than the other sets, but only one contact such as 22 need be chosen here for purposes of discussion. Tuning is accomplished by angularly positioning the rotor so as to bring the desired one of the contacts, such as 22, into mechanical and electrical contact with the hook portion of a contact spring finger 43. Peripherally each rotor is formed with gear teeth 23.

Referring further to FIG. 3, rotor 21 is rotatably positioned by drive gear 24, and rotor 25 on switch card 26 is rotatably positioned by drive gear 27. The drive gears 24 and 27 are formed with integral axially extending hubs 28 and 29, respectively, and the hubs of gear members 24 and 27 are keyed onto a common drive shaft 30, whereby the drive gears are ganged together to drive the rotors in unison. Each rotor is similarly provided with an individual drive gear.

The various tank circuits (not shown) are mounted adjacent the angularly displaced depressions, such as 47, illustrated in FIG. 3, and electrical connections to those tank circuit elements (not shown) are made through the body of the rotor to the contacts, such as 22, on the rear side thereof, whereby the selection of an angular position for the rotor accomplishes the selection of the appropriate tank circuit. Since several ganged rotors are shown, several tank circuits are simultaneously selected. This tuner is advantageously used in single sideband equipment wherein bands of frequencies are selected by mechanical tuning and then particular channels within said bands are further selected by electronic tuning.

Each of the various shields, such as shield 13, is provided near one of the lower side corners with an alignment bushing such as 31 (FIG. 4). The concentric bushing 31 accepts the bearing portion 32 of a journal member which is flanged at 34. The bushing 31 is press-fitted into shield 13. Bushing 31 projects in complementary fashion through the alignment slot 35 formed in stator 20 of card 19, so that, in cooperation with the slot formations on the side of the housing, the cards are firmly positioned against twisting forces or torque occasioned by the turning of the switch rotors.

The bearing 32 provides a journal for shaft 30 and it is spaced from gear 24 by a spacer member 33.

It will be understood that each one of the circuit card stators is formed with an opening such as 35 (see 35A and stator 20A in FIG. 3) and that each such opening is in mechanical contact with a bushing such as 31, projecting through the associated shield. For example, see bushing 31A projecting from shield 13A and in mechanical contact with opening 35A which is formed as a slot to permit the removal of the circuit card including stator 20A.

It will be understood that each switch card carries a rotor, suitably pivotally mounted thereon, and that a drive gear is provided for each rotor, an alignment slot on each card, and a bushing on each shielding partition (except front 11), whereby the removable cards are mounted with precision and the drive gears are precisely aligned and ganged.

The present embodiment of the invention here shown involves ten angular positions of the rotors for the purpose of selecting the frequency bands. The rotors are ganged to be driven in unison by reason of the fact that the drive gears such as 24 and 25 are ganged by the common shaft 30, which projects through all of the bushings as indicated by the dashed line in FIG. 3.

In accordance with other novel features of the invention advantageous low frequency or direct current connections and radio frequency connections are provided.

Projecting forwardly from the stator of each card is a plug-type connector element 39. Projecting rearwardly from each card is a socket-type connector element 40. These elements are so formed and arranged that they are operable by vertical displacement. That is to say, when card 19 is inserted in the housing, its radio frequency socket member 40 is formed with a slot which is mated with the complementary connector plug element 41 on stator 26, for example. This arrangement of radio frequency connections provides radio frequency feed through from the card located in front all the way to the card located in back.

This arrangement of radio frequency connections has three advantages. The first advantage resides in the fact that the radio frequency connections are automatically made as the cards are inserted in their respective places. The next advantage resides in the fact, as disclosed in FIG. 1, that the various sets of mating connectors such as 40 and 39 may be staggered, i.e., located at different lateral distances from the sides of the housing, and this arrangement assures that the proper cards will be placed in the proper sets of slots in the housing. A further advantage resides in the fact that such a staggered arrangement provides for further isolation of the radio frequency connections. The shields are slotted near the top, as desired, to permit the projections of these connections through the shields.

The discussion now refers to the arrangements by which the low frequency or direct current connections are made. To this end, all of the cards are supported on a platform board 38 (FIG. 3) upon which all of the direct current circuits (not shown) are preferably printed. Connections between the platform card 38 and the stator 20 are established by a complementary vertically displaceable set of connectors 36 and 37, respectively secured to the stator and the platform board. One such set of vertically displaceable connectors is provided for each stator so that all of the stators are mechanically and electrically related to the platform board. It has been previously shown that each stator is also mechanically and electrically related to the immediately adjoining stator or stators by reason of the radio frequency connections.

By reason of the provision of the shields such as 13A, etc. (FIG. 1) the various cards or modules are isolated from each other and stray coupling is prevented.

Referring now to FIG. 2 the description proceeds to the means by which electrical contact is established between the rotor contacts (such as 22) and the stator. On the rear of each stator there are mounted spring contact assemblies each including, side by side, a plurality of spring contacts such as that illustrated at 43. This spring contact is mounted as a cantilever on an anchor member 42 and it is formed with a hook portion at its free end, which hook portion projects through an aperture 46 in the stator and frictionally contacts element 22 carried by the rotor. It has been found in practice that five contacts such as the element 43, lying side by side and closely adjacent to each other, and independently mounted on the same element 42, afford a very low resistance and reliable operation.

The above-described construction has been found to be particularly advantageous as microminiaturized. The assembly is easy to make and to service, and it solves the problem of lead lengths by combining the components and the switch, tank circuit components being mounted directly on the rotor. The formation of switch card inserts and partitions is strong and permits the use of light materials, and the bushings which support the drive shaft are used to position the cards and also to maintain in proper axial relationship the various drive gears. The construction further possesses the advantages of small volume, low weight, rigidly, uniformity of performance, and precision assembly.

Various drive gears 24, 27, and the like are preferably keyed onto the common shaft 30 by set screws, so that the various journals such as 32, spacers such as 33, and drive gears may, in assembly, have the common shaft simply inserted through them, and then the drive gears are keyed to the shaft by set screws. The bushings 31 may, if preferred, be integral with the shields.

Further commenting on FIG. 4, the FIG. 4 view is, indeed, looking in the direction of the arrows 4—4 as shown in FIG. 3, and the section line 4—4 suggests the section from which the view is taken, but in fact the actual section represented by the view 4—4 is displaced inwardly and toward the central axis of the tuner with respect to the section line 4—4 in FIG. 3.

While there has been shown and described what is at present believed to be the preferred embodiment of the invention, it will be understood by those skilled in the art that various changes and modifications may be made therein without departing from the scope of the invention as defined by the appended claims.

We claim:

1. In a tuner construction for an electronics communications system, the combination of:

a metallic housing, formed as a rectangular enclosure with a front, sides, and rear, and including partitions to provide a plurality of compartments;

a horizontally positioned circuit board carrying a plurality of direct current connector members;

a plurality of removable switch cards adapted to be independently individually inserted into said compartments, each of said switch cards comprising a rotor peripherally formed as a gear and having angularly spaced electrical contact elements, and a stator carrying contact means complementary to said elements and a complementary direct current connector member;

the sides of said housing being formed with sets of opposed slot formations for receiving the stators, whereby the switch cards are guided, positioned, and spaced from each other in said compartments;

and means including a common drive shaft and driving gears in engagement with the rotors for driving the rotors in unison;

the vertical placement of each switch card in its compartment mating the direct current connector member carried by its stator with one of the direct current connector members carried by the circuit board, and the angular position of each rotor selecting the contact element to be encircuited with the complementary contact means on its stator.

2. The combination in accordance with claim 1 in which the stators carry near their upper edges radio frequency connectors, said connectors being so formed and arranged in complementary fashion that insertion of a switch card into the housing completes a radio frequency connection between said card and at least one of the adjoining cards.

3. The combination in accordance with claim 2 in which a radio frequency connection is formed, as between switch cards, by a radio frequency connector element extending rearwardly from one stator and a complementary radio frequency connector element extending forwardly from an adjacent stator, the lateral positions of the radio frequency connector elements on each switch card uniquely identifying it.

4. The combination in accordance with claim 3 in which each of the partitions includes, in position near one of its lower corners, a bushing through which said shaft projects, and in which the stators are formed with rounded slots which fit over the bushings, whereby to aid in the positioning of said switch cards.

5. In a tuner construction for an electronics communications system, the combination of:

a metallic housing;

a plurality of removable switch cards adapted to be independently individually inserted into said compartments, each of said switch cards comprising a rotor having a plurality of tank circuits separately connected to angularly spaced electrical contact elements, and a stator carrying contact means complementary to said elements;

and means for driving the rotors in unison, the angular position of each rotor selecting the tank circuit and contact element to be encircuited with the complementary contact means on its stator.

6. In a tuner construction for an electronics communications system, the combination of:

a metallic housing formed as a rectangular enclosure with a front, sides, rear, and including partitions to provide a plurality of compartments;

a horizontally positioned circuit board carrying a plurality of direct current connector members;

a plurality of removable switch cards adapted to be independently individually inserted into said compartments, the sides of said housing being formed with sets of opposed slot formations, whereby the switch cards are guided, positioned, and spaced from each other in said compartments;

each of said switch cards comprising a rotor and a stator carrying horizontally extending radio frequency connector members and a complementary vertically extending direct current connector member;

and means for driving the rotors in unison;

the vertical placement of each card in its compartment mating the direct current connector member carried by its stator with one of the direct current connector members carried by the circuit board, and further mating the radio frequency connector member carried by its stator with the radio frequency connector member carried by an adjoining stator.

7. In a turner construction for an electronics communications system, the combination of:

a metallic housing; and a plurality of removable selector cards adapted to be independently individually inserted into said housing;

the sides of said housing being formed with sets of opposed slot formations for receiving the cards, whereby the cards are guided, positioned, and spaced from each other, each card being provided with a rearwardly extending radio frequency connector and a forwardly extending complementary radio frequency connector, the lateral position of the radio frequency elements on each card uniquely identifying it.

8. The combination in accordance with claim 7 and including a horizontally positioned circuit board carrying a plurality of direct current connector members and complementary direct current connector members carried by said cards.

9. In a tuner construction for an electronics communications system, the combination of:

a metallic housing formed as a rectangular enclosure with a front, sides, rear, and including partitions to provide a plurality of compartments;

a plurality of removable switch cards adapted to be independently individually inserted into said compartments, the sides of said housing being formed with sets of opposed slot formations, whereby the switch cards are guided, positioned, and spaced from each other in said compartments;

each of said switch cards comprising a rotor peripherally formed as a gear and having contact elements, and a stator carrying contact means complementary to said elements;

and means including a common drive shaft offset from the axis of the rotors and driving gears separately mounted on said shaft and in engagement with the rotors for driving the rotors in unison;

the angular position of each stator selecting the contact element which is in contact with the complementary contact means on its stator.

References Cited

UNITED STATES PATENTS

| | | | |
|---|---|---|---|
| Re. 25,595 | 6/1964 | Schwab et al. | 317—101 |
| 2,976,510 | 3/1961 | Blain | 317—101 |
| 2,988,607 | 6/1961 | Tabet | 200—14 |
| 3,026,453 | 3/1962 | Marks | 317—101 |

ROBERT K. SCHAEFER, *Primary Examiner.*

J. R. SCOTT, *Assistant Examiner.*